No. 866,079. PATENTED SEPT. 17, 1907.
T. S. SMITH.
ICE CREAM DIPPER.
APPLICATION FILED FEB. 23, 1907.
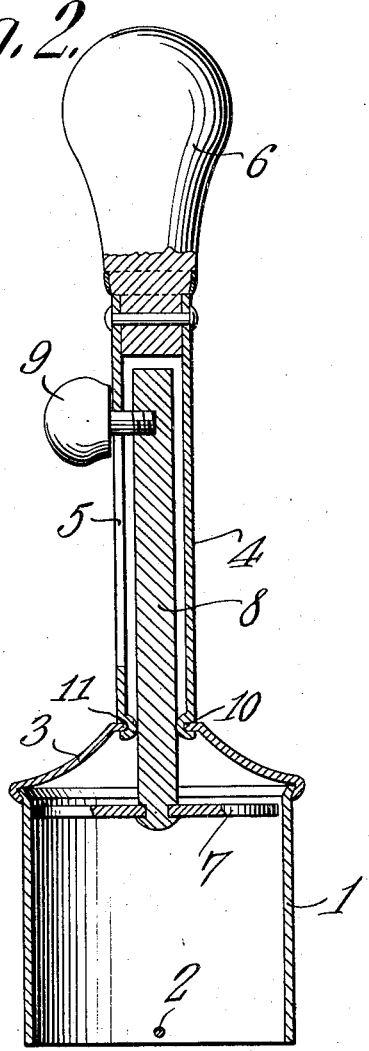
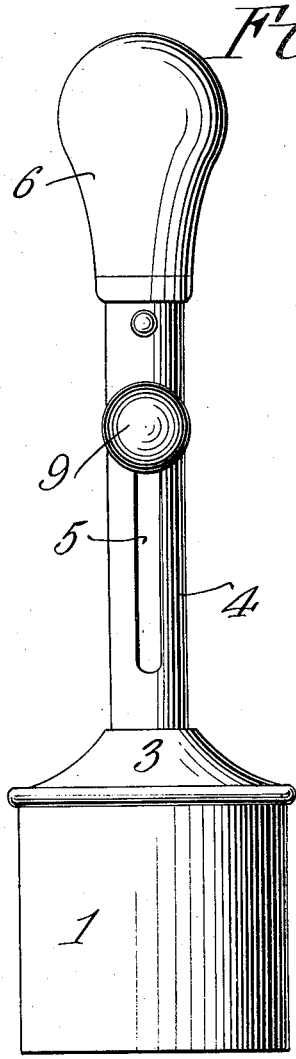
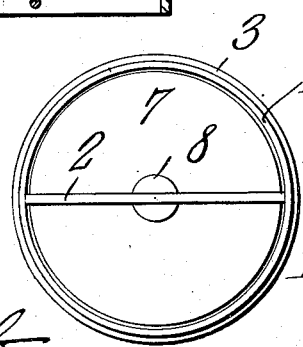
Thaddeus S. Smith,
INVENTOR.
WITNESSES:
By C. A. Snow & Co.
ATTORNEYS

UNITED STATES PATENT OFFICE.

THADDEUS S. SMITH, OF INDIANAPOLIS, INDIANA, ASSIGNOR OF ONE-HALF TO JOHN A. CONKEY, OF INDIANAPOLIS, INDIANA.

ICE-CREAM DIPPER.

No. 866,079.  Specification of Letters Patent.  Patented Sept. 17, 1907.

Application filed February 23, 1907. Serial No. 358,841.

*To all whom it may concern:*

Be it known that I, THADDEUS S. SMITH, a citizen of the United States, residing at Indianapolis, in the county of Marion and State of Indiana, have invented a new and useful Ice-Cream Dipper, of which the following is a specification.

The present invention relates to improvements in devices for extracting ice cream from the freezer, and it has for its object to provide an improved device of this character wherein the ice cream or other material to be extracted is introduced to the dipper by a thrusting movement of the latter, and when it has been filled, the material within the dipper is cut off from the remainder in the freezer by a relative turning movement of the dipper, and material is discharged from the dipper by the movement of a plunger, so that the entire operation may be performed with facility and cleanliness, and a uniform quantity of the material may be extracted each time.

To these and other ends, the invention consists in certain improvements and combinations and arrangement of parts, all as will be hereinafter more fully described, the novel features being pointed out particularly in the claims at the end of the specification.

In the accompanying drawing:—Figure 1 is an elevation of an ice cream dipper constructed in accordance with my present invention. Fig. 2 represents a longitudinal section thereof on the line 2—2 of Fig. 1. Fig. 3 is a view looking into the bottom of the receptacle.

Corresponding parts in the several figures are indicated throughout by similar characters of reference.

The invention provides a device embodying a receptacle portion adapted to be thrust into the mass of ice cream or other material, and a plunger operating in said receptacle arranged to be retracted by the ice cream as it fills the receptacle; when the dipper has been filled, the contents thereof may be expelled by operating the plunger, as desired, by means of a button projection arranged on the exterior of the device, the discharging of the material being entirely under the control of the operator, and the operating means for the plunger is independent of the means for introducing the device into the freezer, so that the construction is simplified and certainty of operation is insured.

In the present embodiment of the invention, the device comprises a cylindrical receptacle 1 composed, preferably, of sheet material and having a capacity determined according to the quantity of ice cream or other material to be vended at a given price, in order that the dipper may be self measuring, and extending diametrically across the bottom of the receptacle is a knife or cutting-off device 2 which serves to sever the material within the receptacle from that in the freezer when the receptacle is rotated, a half revolution being sufficient in the present instance. To the top of this receptacle is fitted a flange or cover 3 having a central aperture into which the lower end of a tubular shank 4 is fitted, the axis of the latter being arranged in alinement with the axis of the cylindrical receptacle 1, and this tubular shank is provided with a longitudinal slot 5, and a handle 6 at its upper end, the latter providing a grip for the hand by means of which the dipper may be thrust into the freezer and conveniently handled in discharging the material therefrom. In the present instance, the tubular shank is rigidly and permanently attached to the top of the receptacle by forming a circumferential groove 10 on the lower end of the shank which is of a size to fit into an aperture 11 of the receptacle top which is smaller than the diameter of the shank, the end of the latter beyond the groove being upset to grip the under side of the receptacle top and thereby secure it. The reduction of the internal diameter of the shank at the point where the groove is formed provides a guide which coöperates with the guiding stem of the plunger and thereby centers the plunger axially of the receptacle.

Within the receptacle is mounted a plunger 7 arranged to reciprocate axially thereof and having a stem 8 rigidly attached thereto and extending longitudinally of the shank 4, the stem having a button or projection 9 thereon extending through the longitudinal slot 5 and providing means whereby the plunger may be reciprocated manually at the exterior of the device.

In operation, the device is introduced into the freezer by a relative axial movement, the cylindrical receptacle being immersed into the ice cream or other material until a quantity of the latter fills the receptacle, and in doing so, the material will lift the plunger into a retracted position. A partial revolution of the receptacle on its axis will move the knife through the material at the bottom of the receptacle, thereby serving to sever the ice cream or other material within the receptacle from that in the freezer, even though the ice cream may be comparatively soft, and this knife also serves to prevent accidental discharge of the ice cream from the receptacle. The ice cream may be discharged from the dipper into a plate or dish by operation of the button or projection 9 in a direction that will move the plunger toward the lower end of the receptacle, the movement of the plunger in this direction serving to expel the contents of the receptacle.

An ice cream dipper constructed in accordance with my present invention enables measured quantities of ice cream to be extracted from the freezer and conveniently deposited into dishes, as may be desired, the device for operating the plunger to expel the ice cream being separate from the handle or other means employed for manipulating the dipper, so that certainty of operation is insured, and the construction of the device is so simple that it may be manufactured at small cost and can be quickly and thoroughly sterilized or cleansed.

What is claimed is:—

An ice cream dipper embodying a receptacle open at its lower end and provided with a top having a reduced opening therein, a tubular shank of a diameter greater than that of the aperture in the receptacle top and having a circumferential groove at one end to receive the top, the material of the shank adjacent the groove being headed over to rigidly secure the top, and the groove forming a reduced portion within the shank, a plunger mounted to operate in the receptacle and having a stem extending axially of the shank and coöperating with the reduced portion formed by the groove and serving as a guide for axially centering the plunger, an operating and guiding head fixed to the plunger stem and projecting through the side of the tubular shank, a handle rigidly secured to the upper end of the shank and serving to operate the receptacle independently of the plunger, a knife arranged at the lower end of the receptacle, and means coöperating with the operating head for limiting the movement of the plunger toward the knife.

In testimony that I claim the foregoing as my own, I have hereto affixed my signature in the presence of two witnesses.

THADDEUS S. SMITH.

Witnesses:
W. C. GAUNT,
E. W. McGINNIS.